(12) United States Patent
Yan et al.

(10) Patent No.: US 11,243,771 B2
(45) Date of Patent: Feb. 8, 2022

(54) DATA COMPUTING SYSTEM

(71) Applicant: C-SKY Microsystems Co., Ltd., Zhejiang (CN)

(72) Inventors: Chengyang Yan, Hangzhou (CN); Maoyuan Lao, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 0 days.

(21) Appl. No.: 16/479,320

(22) PCT Filed: Mar. 6, 2019

(86) PCT No.: PCT/CN2019/077132
§ 371 (c)(1),
(2) Date: Jul. 19, 2019

(87) PCT Pub. No.: WO2019/179311
PCT Pub. Date: Sep. 26, 2019

(65) Prior Publication Data
US 2021/0055879 A1 Feb. 25, 2021

(30) Foreign Application Priority Data
Mar. 21, 2018 (CN) .......................... 201810235312.9

(51) Int. Cl.
*G06F 3/06* (2006.01)
*G06F 7/491* (2006.01)
(Continued)

(52) U.S. Cl.
CPC ........ *G06F 9/30189* (2013.01); *G06F 3/0604* (2013.01); *G06F 3/0673* (2013.01);
(Continued)

(58) Field of Classification Search
None
See application file for complete search history.

(56) References Cited

U.S. PATENT DOCUMENTS 6,219,764 B1 4/2001 Jeddeloh
6,526,430 B1 2/2003 Hung et al.
(Continued)

FOREIGN PATENT DOCUMENTS

CN 101794210 A 8/2010
CN 102122275 A 7/2011
(Continued)

OTHER PUBLICATIONS

Chinese search report issued in corresponding Application No. 2018102353129, dated Dec. 23, 2019 (2 pages).
(Continued)

*Primary Examiner* — Stephanie Wu
(74) *Attorney, Agent, or Firm* — Finnegan, Henderson, Farabow, Garrett & Dunner, LLP

(57) ABSTRACT

The present disclosure provides a data computing system. The data computing system comprises: a memory, a processor and an accelerator, wherein the memory is communicatively coupled to the processor and configured to store data to be computed and a computed result, the data being written by the processor; the processor is communicatively coupled to the accelerator and configured to control the accelerator; and the accelerator is communicatively coupled to the memory and configured to access the memory according to pre-configured control information, implement a computing process to produce the computed result and write the computed result back to the memory. The present disclosure also provides an accelerator and a method performed by an accelerator of a data computing system. The present disclosure can improve the execution efficiency of the processor and reduce the computing overhead of the processor.

15 Claims, 3 Drawing Sheets

(51) Int. Cl.
*G06N 3/04* (2006.01)
*G06F 9/30* (2018.01)
*G06F 7/498* (2006.01)

(52) U.S. Cl.
CPC .......... *G06F 7/4915* (2013.01); *G06F 7/4983* (2013.01); *G06N 3/0481* (2013.01)

(56) References Cited

U.S. PATENT DOCUMENTS

| | | |
|---|---|---|
| 2010/0185425 A1 | 7/2010 | Li et al. |
| 2013/0185270 A1 | 7/2013 | Brower et al. |
| 2018/0046903 A1 | 2/2018 | Yao et al. |
| 2018/0189215 A1* | 7/2018 | Boesch .................. G06N 3/08 |
| 2018/0314941 A1* | 11/2018 | Lie ........................ G06N 3/04 |
| 2018/0315158 A1* | 11/2018 | Nurvitadhi ............ G06F 9/3017 |
| 2018/0341495 A1* | 11/2018 | Culurciello ............ G06N 3/04 |
| 2019/0114534 A1* | 4/2019 | Teng ...................... G06N 3/08 |
| 2020/0285446 A1* | 9/2020 | Han ........................ G06N 3/063 |

FOREIGN PATENT DOCUMENTS

| | | |
|---|---|---|
| CN | 103677739 A | 3/2014 |
| CN | 107391447 A | 11/2017 |
| CN | 107527090 A | 12/2017 |
| CN | 107622305 A | 1/2018 |
| CN | 107688469 A | 2/2018 |
| CN | 108446096 A | 8/2018 |
| WO | WO 2019/179311 A1 | 9/2019 |

OTHER PUBLICATIONS

Extended European search report in European Application No. 19771895.0, dated Mar. 26, 2021 (19 pages).
International search report and written opinion in European Application No. PCT/CN2019/077132, dated Jun. 4, 2019 (8 pages).
Jiantao Qiu et al. "Going Deeper with Embedded FPGA Platform for Convolutional Neural Network". Proceedings of the 2016 ACM/SIGDA International Symposium on field-programmable gate arrays, pp. 26-35 (2016). New York, New York, USA.
Chinese supplemental search report issued in corresponding Application No. 2018102353129, dated Jul. 10, 2020 (1 page).

* cited by examiner

DATA COMPUTING SYSTEM

CROSS REFERENCE TO RELATED APPLICATION

This disclosure is a national stage filing under 35 U.S.C. § 371 of International Application No. PCT/CN2019/0077132, filed on Mar. 6, 2019, which claims the benefits of priority to Chinese application number 201810235312.9 filed Mar. 21, 2018, both of which are incorporated herein by reference in their entireties.

BACKGROUND

Along with the development of artificial intelligence (AI) technology, computing capacity and computing speed play indispensable roles in the field of AI. A conventional computing implementation method is as follows: a processor accesses a memory through a bus to read data, performs computing to obtain a result, and then writes the computed result back to the memory through the bus. One problem with the conventional computing implementation method is that the processor occupies a large amount of bus resources since the processor needs to access the memory constantly during computing. The execution efficiency of the processor is adversely affected.

SUMMARY OF DISCLOSURE

The present disclosure provides a data computing system, comprising a memory, a processor, and an accelerator. The memory is communicatively coupled to the processor and configured to store data to be computed, and the data is written by the processor. The processor is communicatively coupled to the accelerator and configured to control the accelerator. The accelerator is communicatively coupled to the memory and configured to access the memory according to pre-configured control information, implement data computing, and write a computed result back into the memory. The present disclosure also provides an accelerator and a method performed by an accelerator of a data computing system.

DETAILED DESCRIPTIONS

To make the objectives, technical solutions and advantages of the embodiments of the present disclosure clearer, the technical solutions in the embodiments of the present disclosure are described below with reference to the accompanying drawings in the embodiments of the present disclosure. Obviously, the described embodiments are merely some rather than all of the embodiments of the present disclosure. Based on the embodiments in the present disclosure, all other embodiments obtained by those with ordinary skill in the art without creative efforts should fall within the protective scope of the present disclosure.

The data computing system provided in the present disclosure can improve the execution efficiency of a processor and reduce the computing overhead of the processor. The data computing system provided in some embodiments of the present disclosure adds an accelerator on the basis of the original memory and processor. The processor controls the accelerator using a bus, and the accelerator accesses the memory, performs data computing and writes a computed result back to the memory after completing the computing. Compared with conventional structures, the processor controls the accelerator, and the specific data computing is completed by the accelerator. The computing process is executed by the accelerator independently, and it neither occupies a computing unit of the processor nor occupies bus resources. The processor can process other events while the accelerator is performing the computing process and the computing performance of the accelerator is not adversely affected. Therefore, the execution efficiency of the processor is improved, the computing overhead of the processor is reduced, and the time spent on data computing is also reduced.

Figure 1:
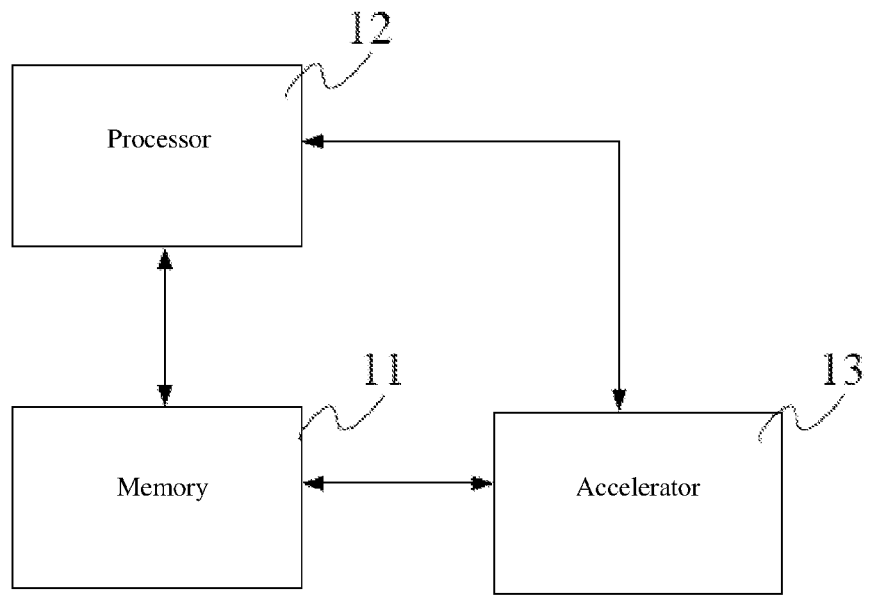
FIG. 1 is a schematic diagram of an exemplary data computing system, according some embodiments of the present disclosure.

The embodiments of the present disclosure provide a data computing system. FIG. 1 is a schematic diagram of an exemplary data computing system, according some embodiments of the present disclosure. As shown in FIG. 1, the data computing system comprises a memory 11, a processor 12 and an accelerator 13.

Memory 11 is communicatively coupled to processor 12 and configured to store data to be computed. All the data to be computed is written by processor 12 into memory 11.

Processor 12 is communicatively coupled to accelerator 13 and configured to control accelerator 13.

Accelerator 13 is communicatively coupled to memory 11 and configured to access memory 11 according to pre-configured control information, to implement data computing process, and to write a computed result back to memory 11.

In some embodiments, when performing data computing process, processor 12 of the data computing system provided in the embodiments of the present disclosure controls accelerator 13 but does not perform the data computing process. The data computing process is completed by accelerator 13. Therefore, during the computing process, processor 12 does not need to access memory 11 and hence does not occupy the bus, thereby improving the utilization of the bus. At the same time, when accelerator 13 executes the data computing, processor 12 can process other events, and therefore the utilization of the processor is also improved. In addition, accelerator 13 can be coupled to any type of memory for computing.

In addition, an experimental verification of wake-on-voice algorithm can be performed using some embodiments of the present disclosure. In conventional systems, the experimental data result indicates that for the same wakeon-voice algorithm, the processing speed needs to be maintained at 196 MCPS (Millions of Cycles Per Second). In the present disclosure, the processing speed can reach 90 MCPS using accelerator 13. The performance can be improved by about 55%.

Figure 2:
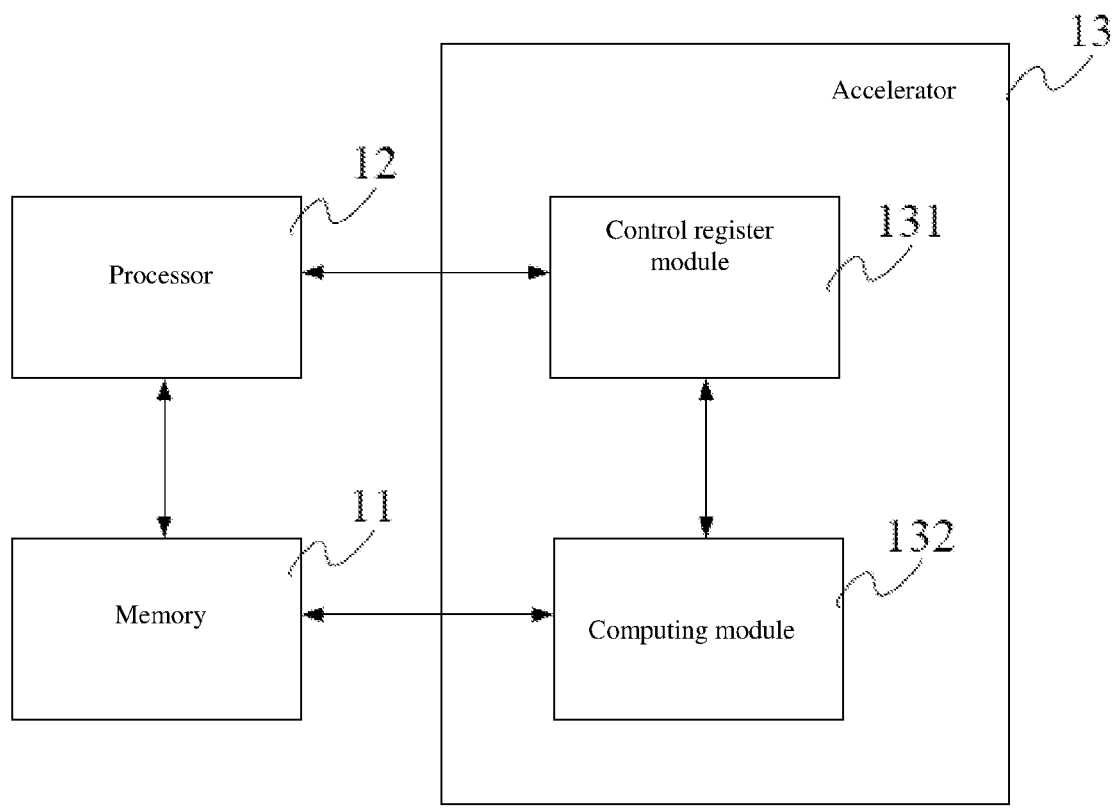
FIG. 2 is a schematic diagram of an exemplary accelerator, according to some embodiments of the present disclosure.

FIG. 2 is a schematic diagram of an exemplary accelerator, according to some embodiments of the present disclosure. As shown in FIG. 2, accelerator 13 includes control register module 131 and computing module 132.

Control register module 131 is communicatively coupled to process& 12 and configured to store control information. The control information is pre-configured by processor 12 using a bus to deliver instructions.

Computing module 132 is communicatively coupled to memory 11 and configured to access memory 11 according to the control information, to implement data computing, and to write a computed result back to memory 11.

In some embodiments, the control information includes a start address for the data to be computed, the number of operands, a computing type, a write-back address for a computed result, and a computing enable flag. The computing type includes multiply-accumulate operation, exponential function, sigmoid function, rectifier (ReLU) function, and softmax function. In other words, computing module 132 can implement multiply-accumulate operations, exponential functions, sigmoid functions, rectifier (ReLU) functions, and softmax functions. The computing types of the present disclosure, however, are not limited to the several types above, and the computing type can be customized according to actual requirements of a software application. During execution, the computing type can be controlled by the processor in such a manner that its use is flexible and convenient. Moreover, hardware implementations of the computing type can be added or deleted according to actual requirements in order to achieve the effect of optimizing the chip area.

After detecting that the computing enable flag is 1, computing module 132 reads the data to be computed sequentially from memory 11 according to the start address for the data to be computed and the number of operands, and then performs data computing according to the computing type and writes a computed result back to memory 11 according to the write-back address for computed result. At the same time, computing module 132 resets the computing enable flag. After reading that the computing enable flag is 0, processor 12 can start the next computing or can read the computed result from memory 11.

Figure 3:
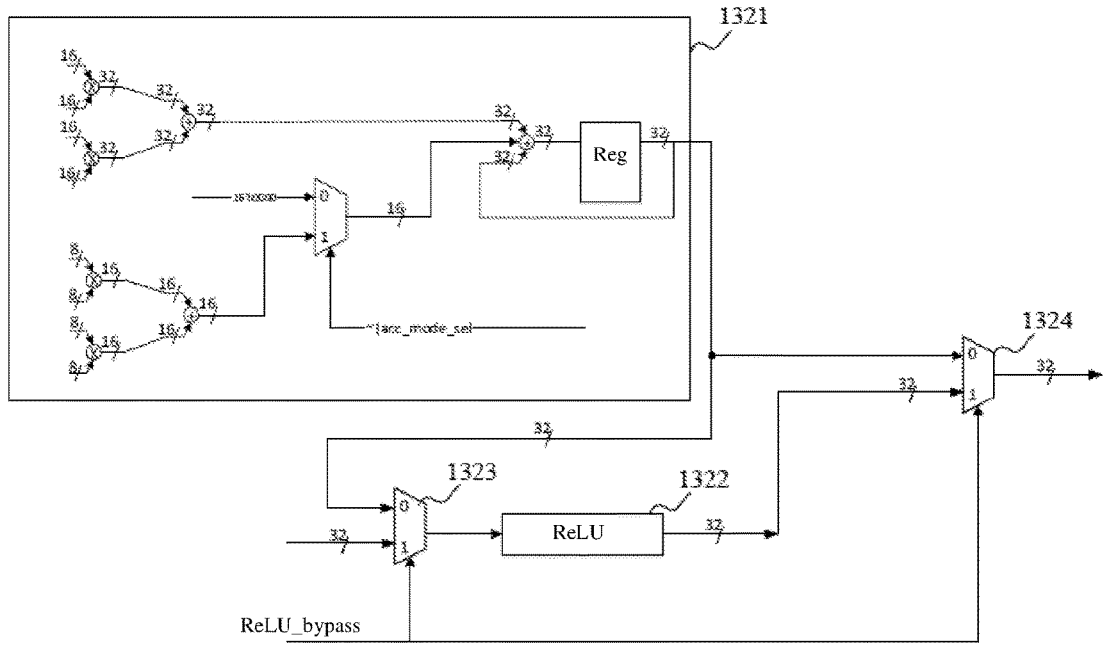
FIG. 3 is a schematic diagram of an exemplary computing module, according to some embodiments of the present disclosure.

FIG. 3 is a schematic structural diagram of an exemplary computing module, according to some embodiments of the present disclosure. As shown in FIG. 3, when implementing the multiply-accumulate operation or rectifier (ReLU) function, computing module 132 comprises a multiply-accumulate unit 1321, a rectifier (ReLU) computing unit 1322, a first multiplexer 1323 and a second multiplexer 1324.

Multiply-accumulate unit 1321 comprises a 2-channel 16-bit multiplier 13211, a 2-channel 8-bit multiplier 13212, an accumulator 13214 and a register 13213. Multiply-accumulate unit 1321 is configured to perform parallel computing using 2-channel 16-bit multiplier 13211 and 2-channel 8-bit multiplier 13212, and store a multiply-accumulate computed result into register 13213.

Rectifier (ReLU) computing unit 1322 is configured to perform rectifier (ReLU) function computing for input data 1320 or the multiply-accumulate computed result from multiply-accumulate unit 1321.

First multiplexer 1323 is configured to select, according to signal ReLU_bypass, either the multiply-accumulate computed result from multiply-accumulate unit 1321 or input data 1320 as the data input to rectifier (ReLU) computing unit 1322.

Second multiplexer 1324 is configured to select, according to signal ReLU_bypass, whether to perform rectifier (ReLU) function computing for the multiply-accumulate computed result from multiply-accumulate unit 1321.

Figure 4:
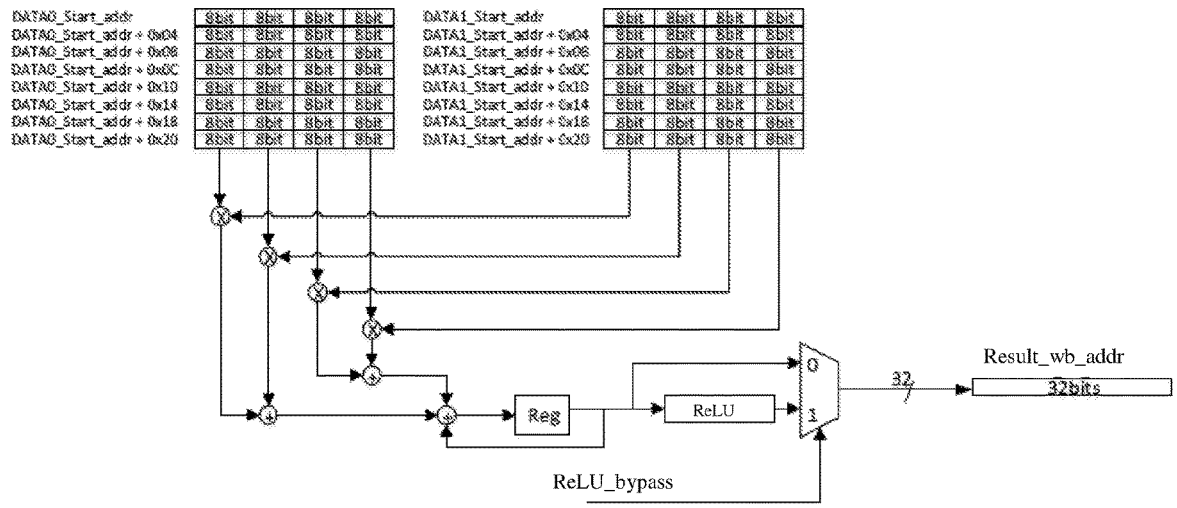
FIG. 4 is a diagram of an exemplary 32-channel 8×8 multiply-accumulate data storage format and computing process, according to some embodiments of the present disclosure.

FIG. 4 is a diagram of an exemplary 32-channel 8×8 data storage format and computing process, according to some embodiments of the present disclosure. According to FIG. 4, to perform a 32-channel 8×8 multiply-accumulate computing, the computing process is illustrated below.

Processor 12 writes data A and data B into memory 11 through the bus, and no data is written until the subsequent computing process is completed. If the data to be computed needs to be replaced after the computing process is completed, processor 12 rewrites the data to be computed.

After the data to be computed is written into memory 11, processor 12 configures control register module 131 of accelerator 13, a start address for data A (DATA0_Start_addr), a start address for data B (DATA1_Start_addr), and a write-back address (Result_wb_addr) for a computed result.

Processor 12 then configures the computing type to be the 32-channel 8×8 multiply-accumulate computing (e.g., the computing of FIG. 4), sets the number of operands to 32 and sets the computing enable flag to 1.

After detecting that the computing enable flag is 1, computing module 132 of accelerator 13 starts the computing process, reads the data to be computed from memory 11 according to the start address for data A (DATA0_Start_addr), the start address for data B (DATA1_Start_addr) and the number of operands, and performs multiply-accumulate computing.

After the computing is completed, the computed result is written back into memory 11 according to the write-back address (Result_wb_addr), and the computing enable flag is reset.

After reading that the computing enable flag is 0, processor 12 can initiate the next computing process or read the computed result from memory 11.

Figure 5:
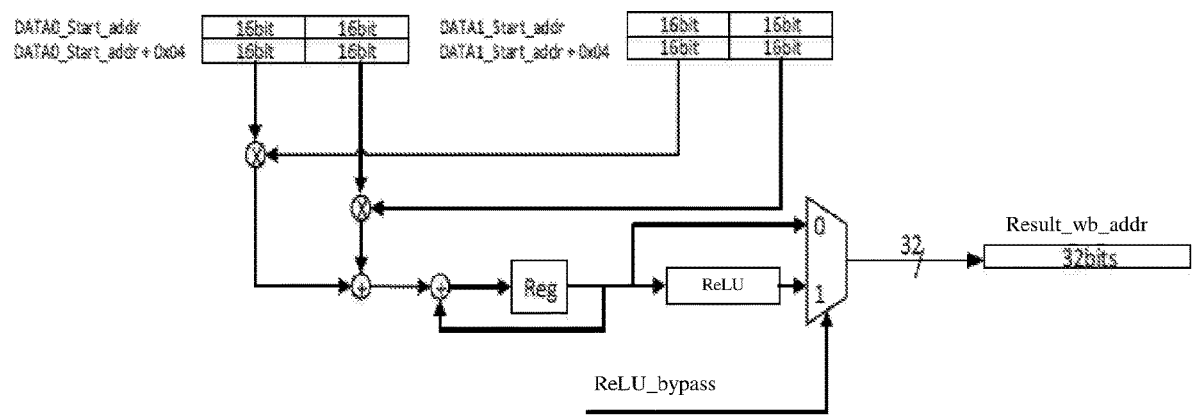
FIG. 5 is a diagram of an exemplary 4-channel 16×16 multiply-accumulate data storage format and computing process, according to some embodiments of the present disclosure.

FIG. 5 is a diagram of an exemplary 4-channel 16×16 multiply-accumulate data storage format and computing process, according to some embodiments of the present disclosure. According to FIG. 5, to perform a 4-channel 16×16 multiply-accumulate computing, the computing process is illustrated below.

Processor 12 writes data A and data B into memory 11 through the bus, and no data is written until the subsequent computing process is completed. If the data to be computed needs to be replaced after the computing process is completed, processor 12 rewrites data to be computed.

After the data is written into memory 11, processor 12 configures control register module 131 of accelerator 13, a start address for data A (DATA0_Start_addr), a start address for data B (DATA1_Start_addr), and a write-back address (Result_wb_addr) for a computed result.

Processor 12 then configures the computing type to be the 4-channel 16×16 multiply-accumulate computing (e.g., the computing of FIG. 5), sets the number of operands to 4 and sets the computing enable flag to 1.

After detecting that the computing enable flag is 1, computing module 132 of accelerator 13 starts the computing process, reads the data to be computed from memory 11 according to the start address for data A (DATA0_Start_addr), the start address for data B (DATA1_Start_addr) and the number of operands, and performs multiply-accumulate computing.

After the computing is completed, the computed result is written back into memory 11 according to the write-back address (Result_wb_addr), and the computing enable flag is reset.

After reading that the computing enable flag is 0, processor 12 can initiate the next computing process or read the computed result from memory 11.

Figure 6:
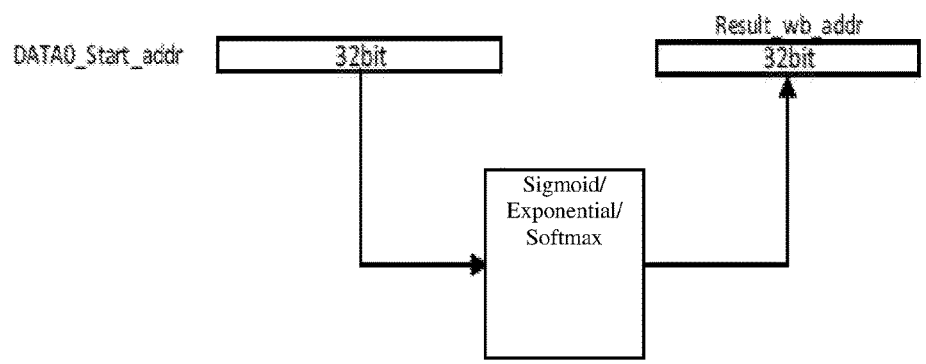
FIG. 6 is a diagram of an exemplary data storage format and computing process for an exponential function, a softmax function and a sigmoid function, according to some embodiments of the present disclosure.

FIG. 6 is a diagram of an exemplary data storage formats and computing process for an exponential function, a softmax function, and a sigmoid function, according to some embodiments of the present disclosure. The computing process of FIG. 6 is similar to the multiply-accumulate computing processes of FIG. 4 and FIG. 5. Instead of the multiply-accumulate computing, processor 12 configures the computing type to be an exponential function, a softmax function, or a sigmoid function.

Some specific embodiments of the present disclosure are described above, but the protective scope of the present disclosure is not limited to these embodiments. Any variation or substitution that can be easily conceived of by those skilled in the art within the technical scope disclosed by the present disclosure should fall within the protective scope of the present disclosure. Therefore, the protective scope of protection of the present disclosure should be subject to the protective scope of the claims.

The invention claimed is:

1. A data computing system comprising:
a memory configured to store data to be computed;
a processor communicatively coupled to the memory and configured to write the data to the memory; and
an accelerator, separate from the processor and memory and communicatively coupled to the memory and the processor, and configured to receive control information from the processor and to access the memory according to the control information, to implement a computing process that produces a computed result, and to write the computed result back to the memory, wherein the computing process is implemented by the accelerator independently from the processor,
wherein the accelerator comprises:
a control register module communicatively coupled to the processor and configured to store the control information that includes an instruction; and
a computing module communicatively coupled to the memory and configured to access the memory according to the control information, to implement the computing process, and to write the computed result back to the memory;
wherein the control information stored in the control register module comprises a start address for the data to be computed, a number of operands, a computing type, a write-back address for the computed result, and a computing enable flag, and
wherein after detecting that the computing enable flag is enabled, the computing module is further configured to read the data from the memory according to the start address and the number of operands, and to implement the computing process according to the computing type, and to write the computed result back to the memory according to the write-back address.

2. The data computing system according to claim 1, wherein the computing type comprises one of multiply-accumulate operation, exponential function, sigmoid function, rectifier function, or softmax function.

3. The data computing system according to claim 1, wherein the computing module is configured to reset the computing enable flag after the computing process is completed.

4. The data computing system according to claim 2, wherein the computing module comprises:
a multiply-accumulate unit configured to perform multiply-accumulate operations to generate a result.

5. The data computing system according to claim 4, wherein the computing module comprises:
a rectifier computing unit configured to perform rectifier functions for an input data or the result from the multiply-accumulate unit; and
a first multiplexer configured to select the result from the multiply-accumulate unit or the input data as the data input to the rectifier computing unit.

6. The data computing system according to claim 5, wherein the computing module comprises:
a second multiplexer configured to select the result from the multiply-accumulate unit or the rectifier computing unit as the computed result.

7. The data computing system according to claim 1, wherein the data stored in the memory is not updated during the computing process.

8. An accelerator comprising:
a control register module communicatively coupled to an external processor and configured to receive control information from the external processor, wherein the control information is independently preconfigured by the external processor; and
a computing module communicatively coupled to an external memory associated with the external processor and configured to access the external memory according to the control information, to implement a computing process that produces a computed result, and to write the computed result back to the external memory, wherein the external processor and the external memory are separate from the accelerator,
wherein the control information comprises a start address for the data to be computed, a number of operands, a computing type, a write-back address for the computed result, and a computing enable flag, and
wherein after detecting that the computing enable flag is enabled, the computing module is further configured to read the data from the memory according to the start address and the number of operands, and to implement the computing process according to the computing type, and to write the computed result back to the memory according to the write-back address.

9. The accelerator according to claim 8, wherein the computing type comprises one of multiply-accumulate operation, exponential function, sigmoid function, rectifier function, or softmax function.

10. The accelerator according to claim 8, wherein the computing module is configured to reset the computing enable flag after the computing process is completed.

11. The accelerator according to claim 9, wherein the computing module comprises:
a multiply-accumulate unit configured to perform multiply-accumulate operations to generate a result.

12. The accelerator according to claim 11, wherein the computing module comprises:
a rectifier computing unit configured to perform rectifier functions for an input data or the result from the multiply-accumulate unit; and a first multiplexer configured to select the result from the multiply-accumulate unit or the input data as the data input to the rectifier computing unit.

13. The accelerator according to claim 12, wherein the computing module comprises:
   a second multiplexer configured to select the result from the multiply-accumulate unit or the rectifier computing unit as the computed result.

14. The accelerator according to claim 8, wherein the data stored in the memory is not updated during the computing process.

15. A data computing method performed by an accelerator of a data computing system, the method comprising:
   receiving, by the accelerator of the data computing system from a processor of the data computing system, control information including a start address for data to be computed, a number of operands, a computing type, and a write-back address, the accelerator being separate from the processor, wherein the accelerator comprises:
      a control register module communicatively coupled to the processor and configured to store the control information that includes an instruction; and
      a computing module communicatively coupled to the memory and configured to access the memory according to the control information, to implement a computing process, and to write a computed result back to the memory;
   accessing, by the accelerator, a memory coupled to the processor according to the start address and the number of operands, the accelerator being separate from the memory;
   performing the computing process on the data according to the computing type to produce the computing result, wherein the computing process is performed by the accelerator independently from the processor; and
   writing the computed result to the memory according to the write-back address.

* * * * *